(12) United States Patent
Wilsey et al.

(10) Patent No.: US 8,805,982 B1
(45) Date of Patent: *Aug. 12, 2014

(54) PROGRESSIVELY DETERMINING A NETWORK TOPOLOGY AND USING NEIGHBOR INFORMATION TO DETERMINE NETWORK TOPOLOGY

(75) Inventors: Scott Daniel Wilsey, Mead, WA (US); K. Gintaras Atkinson, San Francisco, CA (US); Darren William Oye, Greenacres, WA (US); Bo Wen, Spokane Valley, WA (US); Louis Reis, Spokane Valley, WA (US)

(73) Assignee: Ciena Corporation, Hanover, MD (US)

( * ) Notice: Subject to any disclaimer, the term of this patent is extended or adjusted under 35 U.S.C. 154(b) by 900 days.

This patent is subject to a terminal disclaimer.

(21) Appl. No.: 11/771,080

(22) Filed: Jun. 29, 2007

(51) Int. Cl.
G06F 15/173 (2006.01)
H04L 12/24 (2006.01)
H04L 12/56 (2006.01)

(52) U.S. Cl.
CPC ............... H04L 41/12 (2013.01); H04L 45/02 (2013.01)
USPC ............ 709/223; 709/224; 709/225; 370/254

(58) Field of Classification Search
CPC .............................. H04L 41/12; H04L 45/02
USPC ................................................. 709/220, 223
See application file for complete search history.

(56) References Cited

U.S. PATENT DOCUMENTS

| | | | | |
|---|---|---|---|---|
| 5,684,967 A | * | 11/1997 | McKenna et al. | 715/853 |
| 5,758,083 A | | 5/1998 | Singh et al. | |
| 5,987,513 A | * | 11/1999 | Prithviraj et al. | 709/223 |
| 6,262,976 B1 | * | 7/2001 | McNamara | 370/254 |
| 6,377,987 B1 | * | 4/2002 | Kracht | 709/220 |
| 6,516,345 B1 | * | 2/2003 | Kracht | 709/220 |
| 6,944,130 B1 | | 9/2005 | Chu et al. | |
| 7,069,343 B2 | * | 6/2006 | Goringe et al. | 709/249 |
| 7,324,447 B1 | | 1/2008 | Morford | |
| 7,343,524 B2 | * | 3/2008 | Klotz et al. | 714/39 |
| 7,352,706 B2 | * | 4/2008 | Klotz et al. | 370/254 |
| 7,447,233 B2 | | 11/2008 | Narad et al. | |
| 2001/0054093 A1 | | 12/2001 | Iwatani | |
| 2003/0046390 A1 | * | 3/2003 | Ball et al. | 709/224 |
| 2004/0054776 A1 | * | 3/2004 | Klotz et al. | 709/224 |
| 2004/0057389 A1 | * | 3/2004 | Klotz et al. | 370/252 |

(Continued)

OTHER PUBLICATIONS

Cisco Systems, "LLDP-MED and Cisco Discovery Protocol"; 2006, published by Cisco Systems, pp. 1-13.

(Continued)

*Primary Examiner* — Backhean Tiv

(74) *Attorney, Agent, or Firm* — Clements Bernard PLLC; Christopher L. Bernard; Lawrence A. Baratta, Jr.

(57) ABSTRACT

An element manager and programming collect a first element topology from a first element among a plurality of elements in a network. The first element topology describes only connections between the first element and other elements of the plurality directly connected to the first element. The element manager and programming collect a second element topology from a second element among the plurality of elements. The second element topology describes only connections between the second element and other elements of the plurality directly connected to the second element. The element manager and programming merge the element topologies collected from the elements into a single network topology describing connections between the plurality of elements.

26 Claims, 10 Drawing Sheets

(56) References Cited

U.S. PATENT DOCUMENTS

| | | |
|---|---|---|
| 2004/0151128 A1* | 8/2004 | Wechter et al. ............... 370/254 |
| 2004/0153863 A1* | 8/2004 | Klotz et al. ..................... 714/45 |
| 2005/0060574 A1* | 3/2005 | Klotz et al. ................... 713/201 |
| 2005/0138157 A1* | 6/2005 | Jung et al. ..................... 709/223 |
| 2006/0023751 A1 | 2/2006 | Wilson et al. |
| 2006/0120297 A1 | 6/2006 | Hamedi et al. |
| 2006/0140136 A1* | 6/2006 | Filsfils et al. ................. 370/255 |
| 2006/0181531 A1* | 8/2006 | Goldschmidt ................ 345/440 |
| 2006/0256733 A1* | 11/2006 | Bejerano ....................... 370/254 |
| 2006/0285487 A1 | 12/2006 | Yasuie et al. |
| 2007/0110072 A1 | 5/2007 | Elias |
| 2007/0115967 A1* | 5/2007 | Vandenberghe et al. ..... 370/389 |
| 2007/0201384 A1 | 8/2007 | Cunningham et al. |
| 2008/0031156 A1* | 2/2008 | Balasubramaniam et al. ............................. 370/254 |
| 2008/0065760 A1* | 3/2008 | Damm et al. ................. 709/224 |
| 2008/0219268 A1 | 9/2008 | Dennison |
| 2008/0320166 A1* | 12/2008 | Filsfils et al. ................. 709/242 |
| 2009/0003333 A1 | 1/2009 | Davison et al. |
| 2009/0003336 A1 | 1/2009 | Daines et al. |
| 2009/0003337 A1 | 1/2009 | Daines et al. |

OTHER PUBLICATIONS

Enterasys; "Configured Neighbor Discovery"; Oct. 15, 2008; pp. 1-14.

Cisco, Catalyst 3560 Switch Software Configuration Guide; Cisco IOS Release 12.2(37)SE, May 2007, Cisco Systems, pp. 16-1-16-18.

* cited by examiner

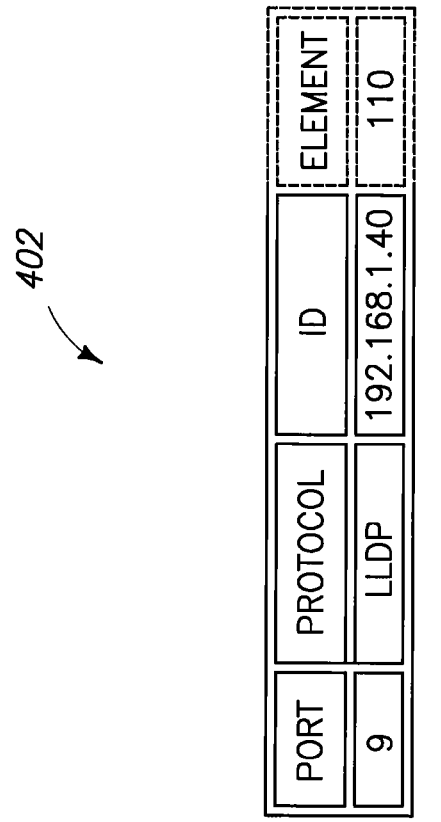
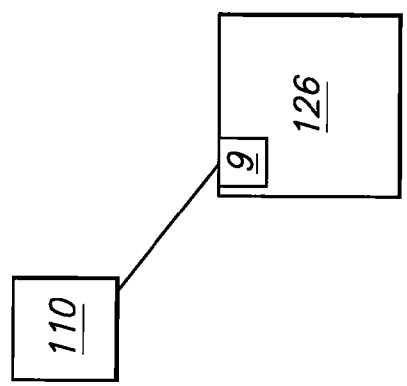
FIG. 4

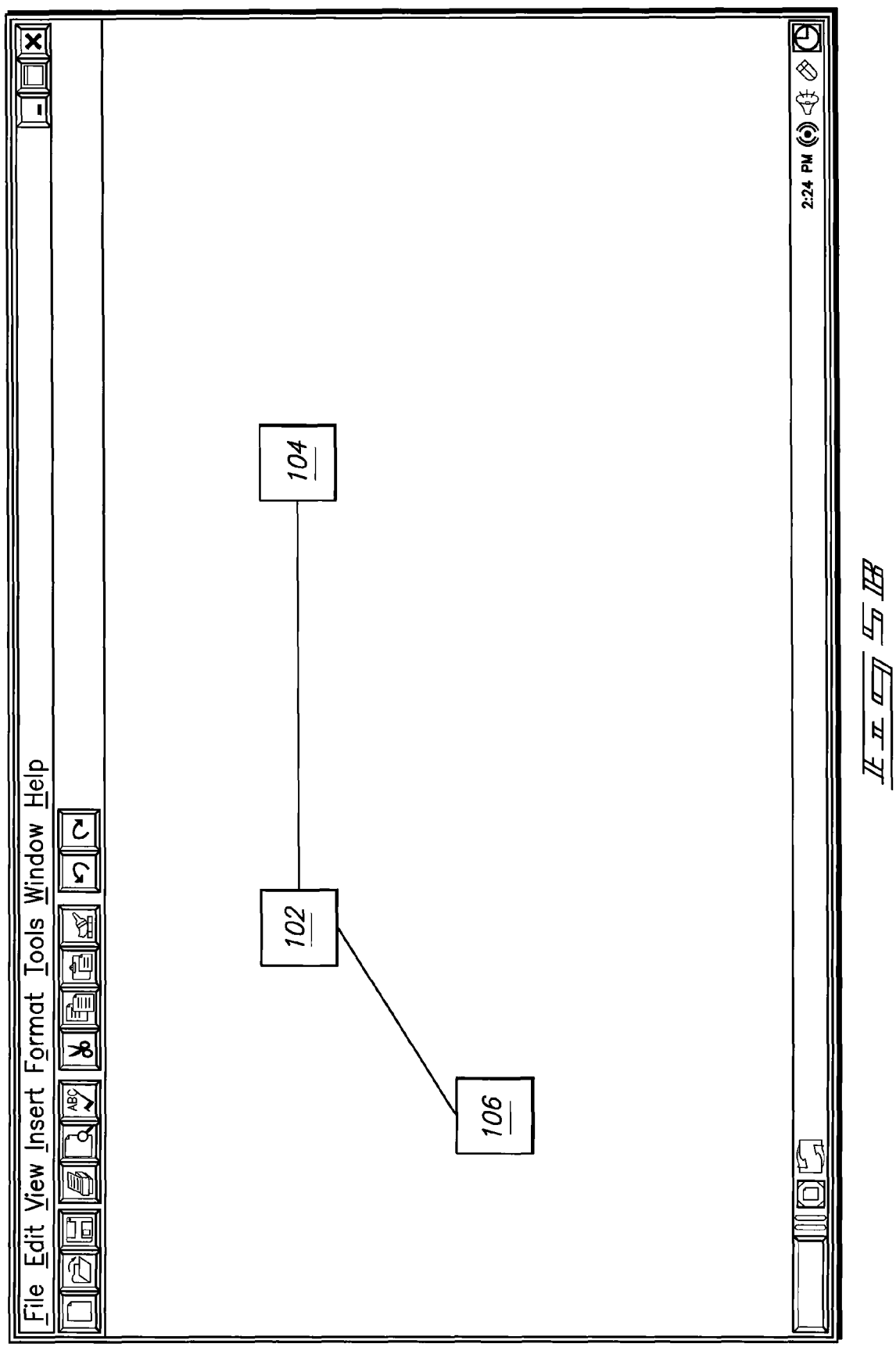

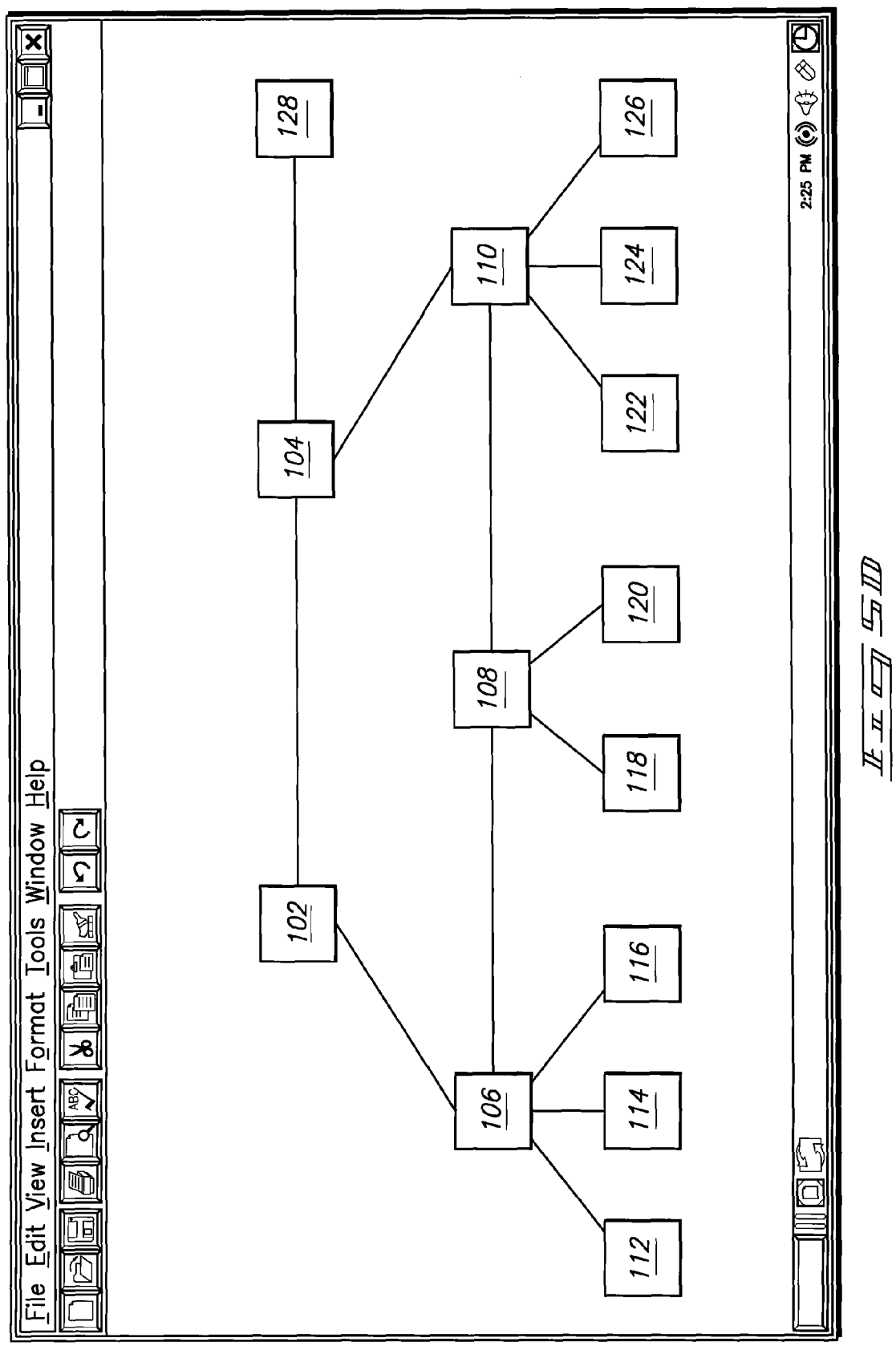

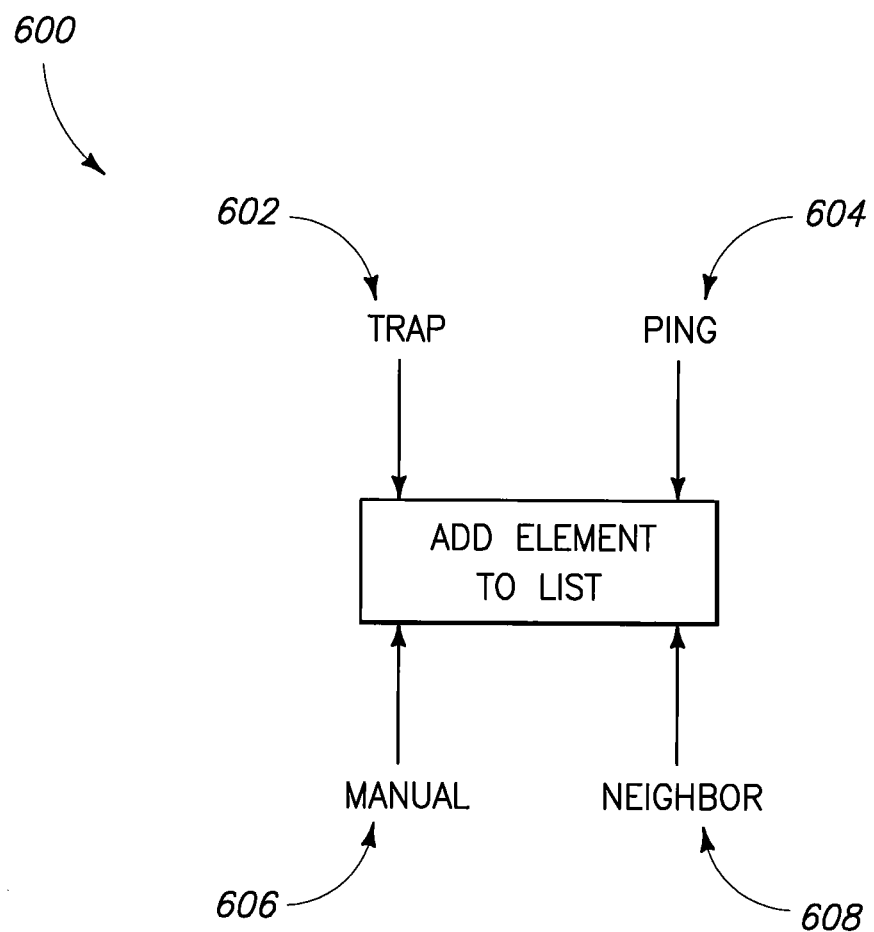

PROGRESSIVELY DETERMINING A NETWORK TOPOLOGY AND USING NEIGHBOR INFORMATION TO DETERMINE NETWORK TOPOLOGY

RELATED APPLICATION DATA

This application is related to simultaneously filed U.S. patent application Ser. No. 11/771,118 entitled "Obtaining Identification Information for a Neighboring Network Element" and naming Eric Stewart Davison, K. Gintarus Atkinson, Scott Daniel Wilsey, Darren William Oye, Bo Wen, and Louis Reis as inventors; simultaneously filed U.S. patent application Ser. No. 11/771,620 entitled "Determining a Logical Neighbor of a Network Element" and naming Kevin Q Daines and Scott Daniel Wilsey as inventors; and simultaneously filed U.S. patent application Ser. No. 11/771,746 entitled "Determining the State of a Tunnel with Respect to a Control Protocol" and naming Kevin Q Daines and Scott Daniel Wilsey as inventors.

TECHNICAL FIELD

The present invention, in various embodiments, relates to progressively determining a network topology and using neighbor information to determine a network topology.

BACKGROUND OF THE INVENTION

Networks of elements (e.g., packet switches, servers, routers, and the like) may be managed by an element manager. The element manager may perform various functions such as receiving alarms from the elements, upgrading software or firmware on the elements, and configuring the elements. In order to manage the elements of the network, the element manager may use addresses of the elements by which the element manager may communicate with the elements. In some cases, a network operator may manually provide the element manager with the addresses. In other cases, the element manager may ping a range of addresses in search of the elements.

For some management functions, the element manager may need connection information describing how the elements connect to each other in order to display a network topology. In some configurations, the network topology may represent physical connections between the elements. Typically, in such configurations, the network operator manually provides connection information describing physical connections between the elements to the element manager.

BRIEF DESCRIPTION OF THE DRAWINGS

Preferred embodiments of the invention are described below with reference to the following accompanying drawings.

FIG. 4 illustrates a third element topology and a third chart containing neighbor information.

FIG. 5B illustrates a second network topology as displayed by an element manager.

FIG. 5D illustrates a fourth network topology as displayed by an element manager.

FIG. 6 illustrates a flow chart diagram of a method in accordance with an aspect of the invention.

DETAILED DESCRIPTION OF THE PREFERRED EMBODIMENTS

According to one aspect of the invention, a network includes a plurality of network elements, a plurality of links, and an element manager. Individual network elements are directly connected to at least one other of the network elements. In some configurations, the network includes at least one hundred network elements.

Individual links directly connect two of the network elements together and enable the two directly connected network elements to communicate with each other. The links may include one or more of electrically conductive cables, fiber-optic cables, or wireless links such as infrared links, radio frequency links, free-space optical links, microwave links, or other types of wireless links that facilitate communication between network elements.

The individual network elements are configured to provide connectivity information describing only their neighboring elements, of the plurality of network elements, to which the individual network elements are directly connected and describing the individual links that directly connect the individual network elements to their neighboring elements.

The network elements may be Ethernet packet switches configured to receive layer-two control packets that include portions of the connectivity information from the neighboring elements. The layer-two control packets may include at least one of Link Layer Discovery Protocol (LLDP) packets; operations, administration, and maintenance (OAM) packets compliant with the IEEE 802.3ah standard; or Link Aggregation Control Protocol (LACP) packets.

The element manager is configured to gather the connectivity information from the network elements and create a network topology based on the gathered connectivity information. The network topology describes the network elements, the links, and an arrangement of the links with respect to the network elements. The element manager may be further configured to display the network topology to a user after gathering the connectivity information from a first subset of the network elements and prior to gathering the connectivity information from a second subset of the network elements.

Figure 1:
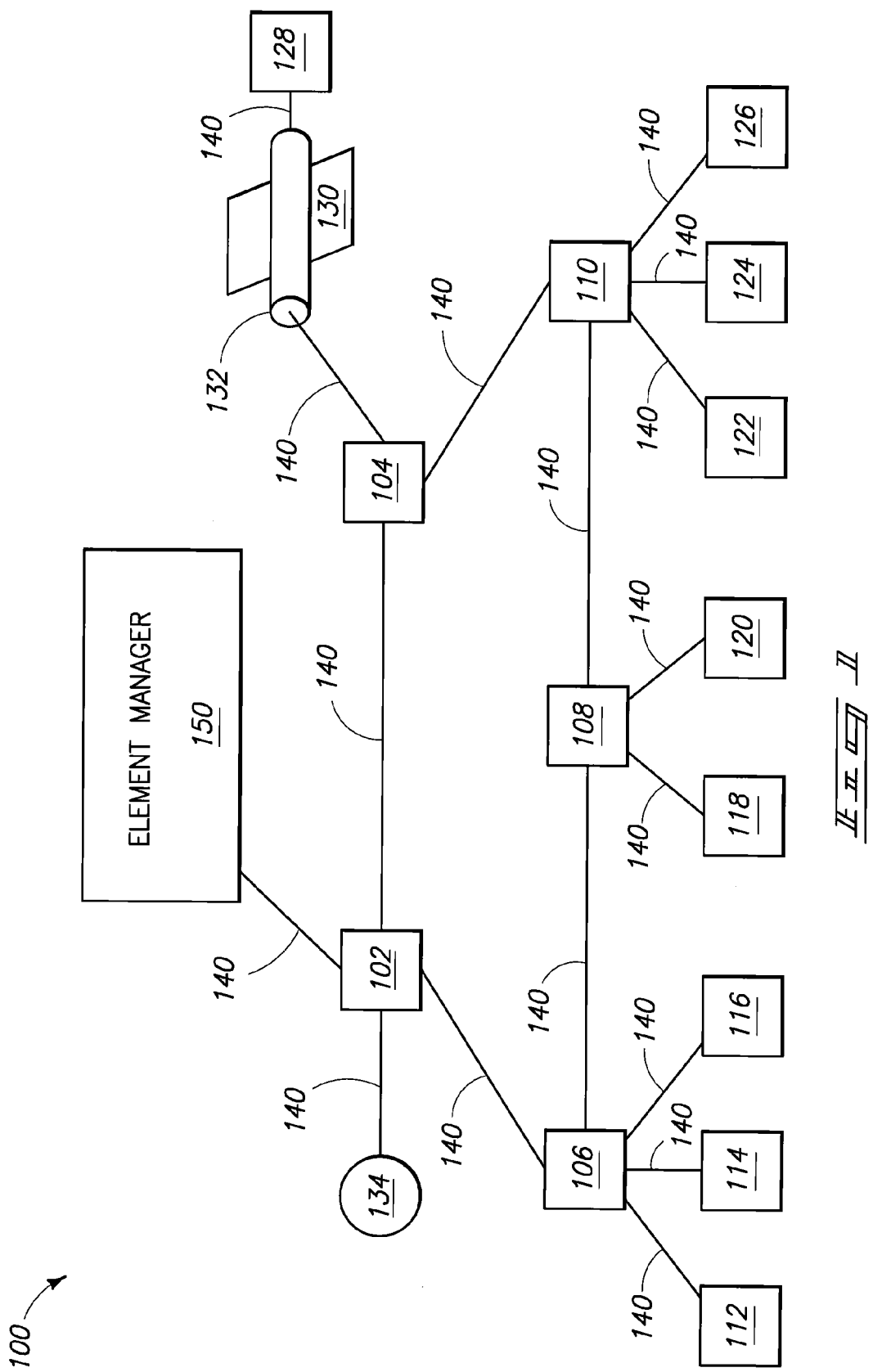
FIG. 1 illustrates a network of elements.

FIG. 1 illustrates a network 100 of elements 102, 104, 106, 108, 110, 112, 114, 116, 118, 120, 122, 124, 126, 128, 130, and 134. The elements may be packet switches, computers, servers, routers, or other devices capable of being connected to a network. The elements of network 100 are interconnected by links 140. Each link directly connects two of the elements of network 100 together. Some of links 140 may be electrically conductive cables, some may be fiber optic cables, and some may be wireless links.

An element manager 150 is connected to element 102 via one of the links. Although physically connected to element 102, element manager 150 has logical connectivity to the other elements of network 100, except for element 134, via links 140. Element manager 150 may communicate with the elements of network 100 using one or more of a variety of techniques. For example, the communication may take place via Simple Network Management Protocol (SNMP) messages, eXtensible Markup Language (XML) messages, command line interface (CLI) commands, remote method invocations (RMI), or NETCONF messages.

In some configurations, element manager 150 may be implemented as software operating on one or more servers. The number of elements that element manager 150 is capable of managing may depend on the specifications of the server(s) on which the software is installed. For example, a low-end server may be able to manage a small number of elements, whereas a cluster of high-end servers may be able to manage a large number of devices.

Element manager 150 may perform various management functions with respect to the elements of network 100. For example, element manager 150 may discover the presence of the elements of network 100 and the connections between the elements as will be described in detail below. Element manager 150 may provide information about network 100, such as topological information, to a network operator.

Element 134, which is illustrated as a circle rather than a square like the other network elements, may be operated by a different network operator than the other elements of network 100 even though element 134 is connected to element 102. Consequently, element 134 may be managed by a different element manager instead of element manager 150. However, although element manager 150 might not directly manage element 134 and might not have access to a management interface of element 134, element manager 150 may still detect the fact that element 134 is connected to element 102.

Although element 104 is not physically connected to element 128, element 104 is logically connected directly to element 128 via a tunnel 132. Tunnel 132 may relay packets from element 104 to element 128 and from element 128 to element 104. Tunnel 132 may be facilitated by intermediate elements such as element 130. Even though element 130 facilitates tunnel 132, packets traveling through tunnel 132 may not exit tunnel 132 at the intermediate element 130. In other words, packets sent from element 104 to tunnel 132 may be delivered only to element 128.

Element manager 150 may determine a topology of the elements of network 100. The network topology may be stored as a model that describes the elements of network 100 and connections between the elements of network 100. Element manager 150 may implement the model in a number of ways. For example, the model may be a collection of objects and relationships between objects. The objects and relationships may be stored in a database. Alternatively, the model may be stored as a collection of variables, records, or other data structures. Element manager 150 may build the model by retrieving information from the elements of network 100 that describes how the elements are interconnected.

Element manager 150 may display the network topology model to a network operator, allowing the network operator to see which elements are part of network 100 and how the elements of network 100 are interconnected. Viewing the network topology may enable the network operator to detect errors in the way network 100 has been implemented.

For example, a network operator may design a network having a particular number of elements connected together in a particular way by links. The network operator may provide the network design to an implementation team that installs the network elements and connects the network elements together. In some cases, the implementation team may incorrectly connect the elements of the network. Consequently, the network as designed may be different from the network as implemented.

Element manager 150 may determine the network topology as implemented by communicating with the network elements and may then display the network as implemented to the network operator. The network operator may then compare the network as implemented with the network as designed to detect errors with the network as implemented.

Furthermore, repeatedly re-determining the network topology after the network topology has been initially determined may be beneficial to a network operator since the network as implemented may change over time due to routine maintenance, repair, upgrades, and expansion.

Initially, element manager 150 might not be aware of any of the elements of network 100. In order to begin modeling the topology of network 100, element manager 150 may be provided with an address of one of the elements of network 100 using one or more of the techniques described below in relation to FIG. 6. For example, element manager 150 may become aware of element 102 if element 102 sends an SNMP trap to element manager 150. Based on the SNMP trap, element manager 150 may determine an IP address of element 102 and may subsequently communicate with element 102 and retrieve neighbor identification information describing elements of network 100 directly connected to element 102.

According to another aspect of the invention, an element manager operating method includes collecting a first element topology from a first element among a plurality of elements in a network, collecting a second element topology from a second element among the plurality of elements, and merging the element topologies collected from the elements into a single network topology describing connections between the plurality of elements. The method may also include displaying the network topology to a user after merging the element topologies. The elements may be packet switches, servers, computers, routers, or other devices configured to be connected to a network.

In some cases, the network topology may be displayed iteratively. For example, after or while displaying the network topology that includes the first and second element topologies, the method may include collecting a third element topology from a third element among the plurality of elements. Next, the method may include merging the third element topology into the single network topology and then displaying the network topology, including the first, second, and third element topologies, to the user.

The first element topology describes connections between the first element and other elements of the plurality directly connected to the first element and the second element topology describes connections between the second element and other elements of the plurality directly connected to the second element. The third element topology may describe only connections between the third element and other elements of the plurality directly connected to the third element.

The first element topology may include information compiled by the first element. The compiled information may result from layer-two (data link layer) communication between the first element and the elements of the plurality directly connected to the first element.

The element topologies may include information gathered by the elements using at least one of LLDP packets conforming to the Institute of Electrical and Electronics Engineers (IEEE) 802.1AB standard; OAM packets conforming to the IEEE 802.3ah standard; or LACP packets conforming to the IEEE 802.3ad standard. More specifically, the element topologies may include information gathered by the elements using OAM packets conforming to the IEEE 802.3ah standard and LLDP packets conforming to the IEEE 802.1AB standard.

The element manager may collect the topologies via SNMP messages, XML messages, responses to CLI commands, replies to RMIs, or NETCONF messages.

Programming configured to cause processing circuitry to perform the method may be included on an article of manufacture, such as a compact disc (CD), digital versatile disc (DVD), a hard disk drive, a memory chip, or other memory device.

Figure 2:
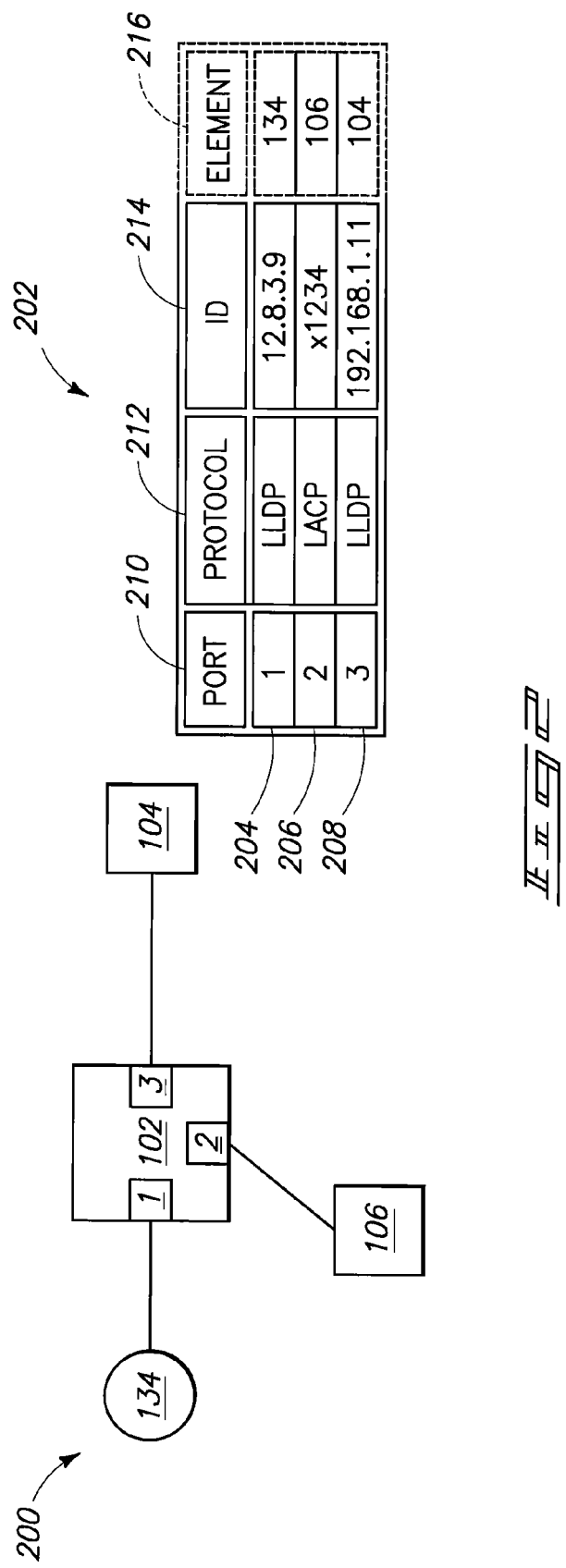
FIG. 2 illustrates a first element topology and a first chart containing neighbor information.

FIG. 2 illustrates an element topology 200 of element 102 including element 102 and elements directly connected to element 102, namely elements 104, 106, and 134, as also shown in FIG. 1. Element topology 200 illustrates that port 1 of element 102 is connected to element 134, port 2 of element 102 is connected to element 106, and port 3 of element 102 is connected to element 104.

Element manager 150 may communicate with element 102 to retrieve neighbor identification information describing element topology 200 from element 102. Chart 202 contains information that element 102 may acquire from elements 104, 106, and 134 that describes elements 104, 106, and 134.

Element 102 may gather the information of chart 202 by communicating with elements 104, 106, and 134 (which may be referred to as neighboring elements of element 102) via layer-two control packets. For example, at row 204 chart 202 depicts information that element 102 may receive in an LLDP packet sent from element 134 to element 102.

LLDP is a layer-two control protocol that elements may use to obtain information about directly connected neighboring elements. For example, element 102 may send an LLDP control packet out on port 1 that is received by element 134. In response, element 134 may send an LLDP control packet to element 102. The LLDP control packet received by element 102 may include information identifying element 134 such as an IP address of a management interface of element 134, a base medium access control (MAC) address of network element 134, and an identifier identifying a port of element 134 to which element 102 is connected.

Row 204 indicates that element 102 has received an LLDP packet from element 134 and that the LLDP packet included an IP address of element 134 (depicted in column 214 of row 204).

Element 102 may have similar communication via a layer-two control protocol with element 104. The results of this layer-two communication are illustrated in row 208, which indicates that element 102 received an LLDP packet from element 104 on port 3 and that the LLDP packet included an IP address of element 104 (depicted in column 214 of row 208).

Element 102 may also communicate via a layer-two protocol with element 106. However, element 106 might not support LLDP. Instead, element 106 may support other layer-two control protocols that may provide identification information to element 102. For example, element 102 may communicate with element 106 by sending a link aggregation control protocol (LACP) packet to element 106. Element 106 may, in response, send a LACP packet to element 102 that includes a MAC address (depicted in column 214 of row 206) associated with a port of element 106 that sent the LACP packet to element 102.

Column 216 of chart 202 is surrounded by dashed lines to indicate that element 102 does not actually receive an element number, such as element number 134, from element 134. Element numbers are included in chart 202 for illustration purposes only. However, the other information in columns 210, 212, and 214 of chart 202 is information that element 102 may compile based on layer-two control protocol communication with neighboring packet switches 104, 106, and 134.

Note that although element 102 is indirectly connected to many other elements of network 100 in FIG. 1(e.g., element 102 is indirectly connected to element 108 via element 106) element 102 might not gather identification information for element 108 because element 102 is not directly connected to element 108.

Element manager 150 may retrieve the information contained in chart 202, or a subset of the information of chart 202, from element 102 by requesting the information via a management interface of element 102 since element manager 150 knows the IP address of element 102. After retrieving the neighbor identification information from element 102, element manager 150 may use the information to communicate with elements 104 and 106.

Note that chart 202 illustrates that element 102 may communicate with neighboring elements directly connected to element 102 using more than one layer-two control protocol. In some cases, some layer-two control protocols may be preferable over other layer-two control protocols. For example, since an LLDP control packet may include an IP address of the neighboring element that sends the LLDP control packet, an LLDP packet may be preferred over an LACP packet that provides a port MAC address (but not an IP address) of the neighboring network element that sends the LACP packet. Element manager 150 may prefer to have IP address over a port MAC address because element manager 150 may need an IP address to communicate with the neighboring network element.

If an IP address is not available for a neighboring network element but a port MAC address is available, element manager 150 may derive the IP address of the neighboring network element from the port MAC address using one or more of a variety of techniques. For example, element manager 150 may determine a base MAC address associated with the chassis of the neighboring network element based on the port MAC address and then look up the base MAC address in a table of learned base MAC addresses to find the IP address.

Although chart 202 illustrates neighbor identification information that element 102 may receive via layer-two control packets, element 102 might not extract or arrange the neighbor identification information in a chart like chart 202. Instead, element 102 may provide the neighbor identification information via one or more management information bases (MIBs), CLI command responses, XML command responses, NETCONF command responses, or the like. Furthermore, element 102 may make additional neighbor identification information available to element manager 150 that is not depicted in chart 202. For example, although row 204 depicts information derived from an LLDP packet received from element 134, element 202 may also have information identifying element 134 that is derived from an LACP packet received from element 134 or from another layer-two control packet received from element 134.

Element manager 150 may retrieve all or a fraction of the neighbor identification information made available by element 102 and then discard portions of the neighbor identification information that are redundant or unnecessary. Alternatively, in some configurations, element 102 may compile the neighbor identification information for element manager 150 in a desired format. For example, element 102 may create a table containing an identifier (such as an IP address or MAC address) of the neighboring element connected to each active port of element 102. Element 102 may provide the table of identifiers in response to receiving a request for the table of identifiers from element manager 150.

Upon receiving the neighbor identification information from element 102, element manager 150 may use the neighbor identification information to communicate with the neighboring elements. For example upon receiving the IP address of element 106 from element 102, element manager 150 may communicate with element 106 and retrieve neighbor identification information from element 106 that describes neighboring elements directly connected to element 106.

Figure 3:
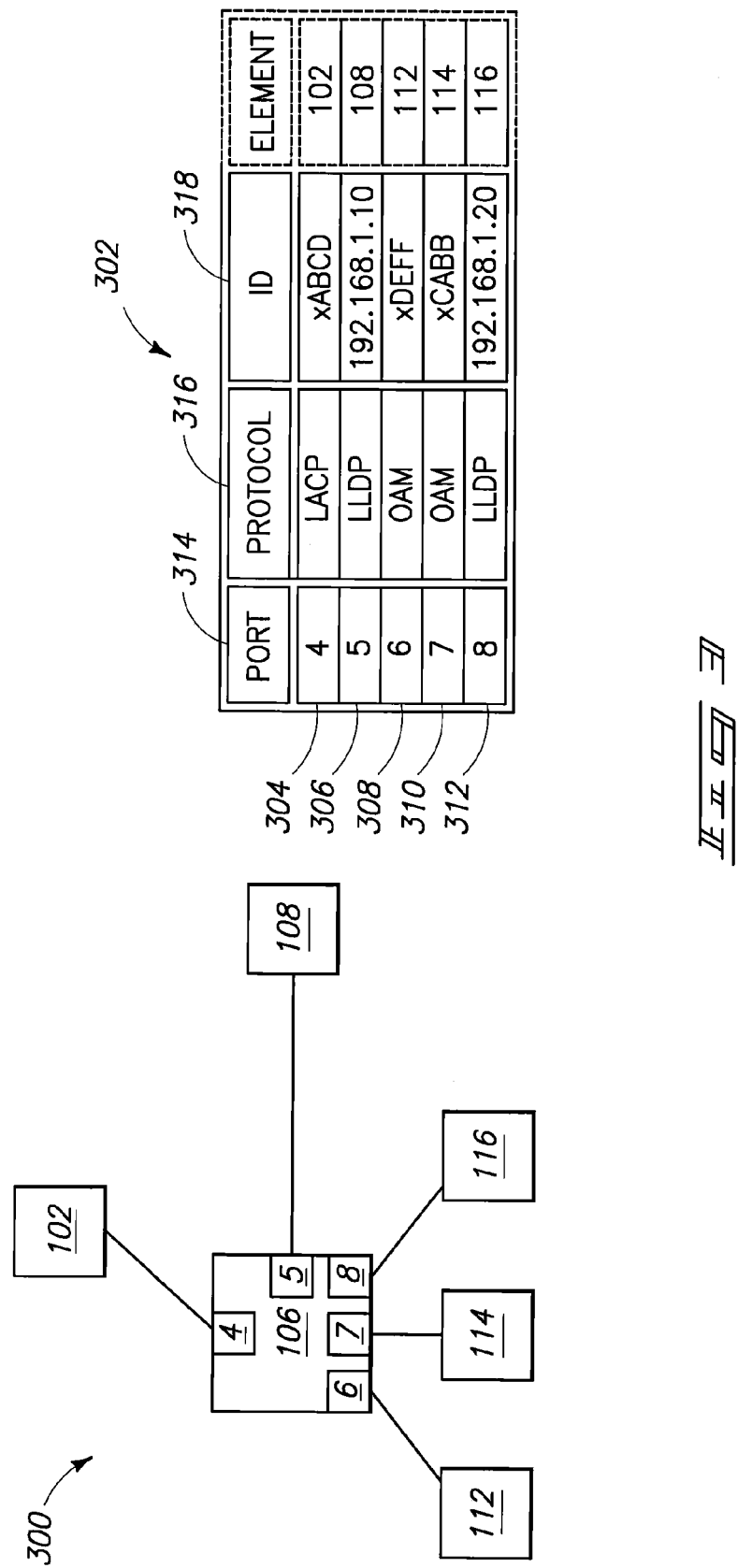
FIG. 3 illustrates a second element topology and a second chart containing neighbor information.

FIG. 3 illustrates an element topology 300 of element 106 including element 106 and elements directly connected to element 106, namely elements 102, 108, 112, 114, and 116, as also shown in FIG. 1. Element topology 300 illustrates that port 4 of element 106 is connected to element 102, port 5 of element 106 is connected to element 108, port 6 of element 106 is connected to element 112, port 7 of element 106 is connected to element 114, and port 8 of element 106 is connected to element 116.

Element manager 150 may communicate with element 106 to retrieve neighbor identification information describing element topology 300 from element 106. Columns 314, 316, and 318 of chart 302 contain neighbor identification information that element 106 may acquire describing neighboring elements directly connected to element 106.

For example, row 306 of chart 302 illustrates that element 106 has received an LLDP packet from element 108 that included an IP address of element 108. Note that rows 308 and 310 indicate that element 106 received OAM control packets from elements 112 and 114 containing MAC addresses of elements 112 and 114.

Although chart 302 illustrates only a single row for each port of element 106, element 106 may in fact communicate with a neighboring element via more than one layer-two control protocol. For example, element 106 may communicate with element 116 via LLDP as well as LACP and OAM. Although row 312 of chart 302 only illustrates information acquired from an LLDP packet received from element 116, element 106 may make information derived from other layer-two control packets received from element 116 available as well.

FIG. 4 illustrates an element topology 400 of element 126 including element 126 and elements directly connected to element 126, namely element 110, as also shown in FIG. 1. Element topology 400 illustrates that port 9 of element 126 is connected to element 110. Element manager 150 may communicate with element 126 to retrieve information describing element topology 400 from element 126. Chart 402 contains neighbor identification information that element 126 may acquire describing neighboring elements directly connected to element 126.

Element manager 150 may similarly determine element topologies for each of the elements of network 100. Element manager 150 may do this using neighbor information acquired from one of the network elements to communicate with additional network elements as was discussed above. For example, element manager 150 may initially communicate with element 102. After retrieving neighbor identification information from element 102, element manager 150 may communicate with elements 104 and 106 to retrieve additional neighbor identification information. Element manager 150 may use the retrieved neighbor identification information to create a network topology describing network 100.

Figure 5A:
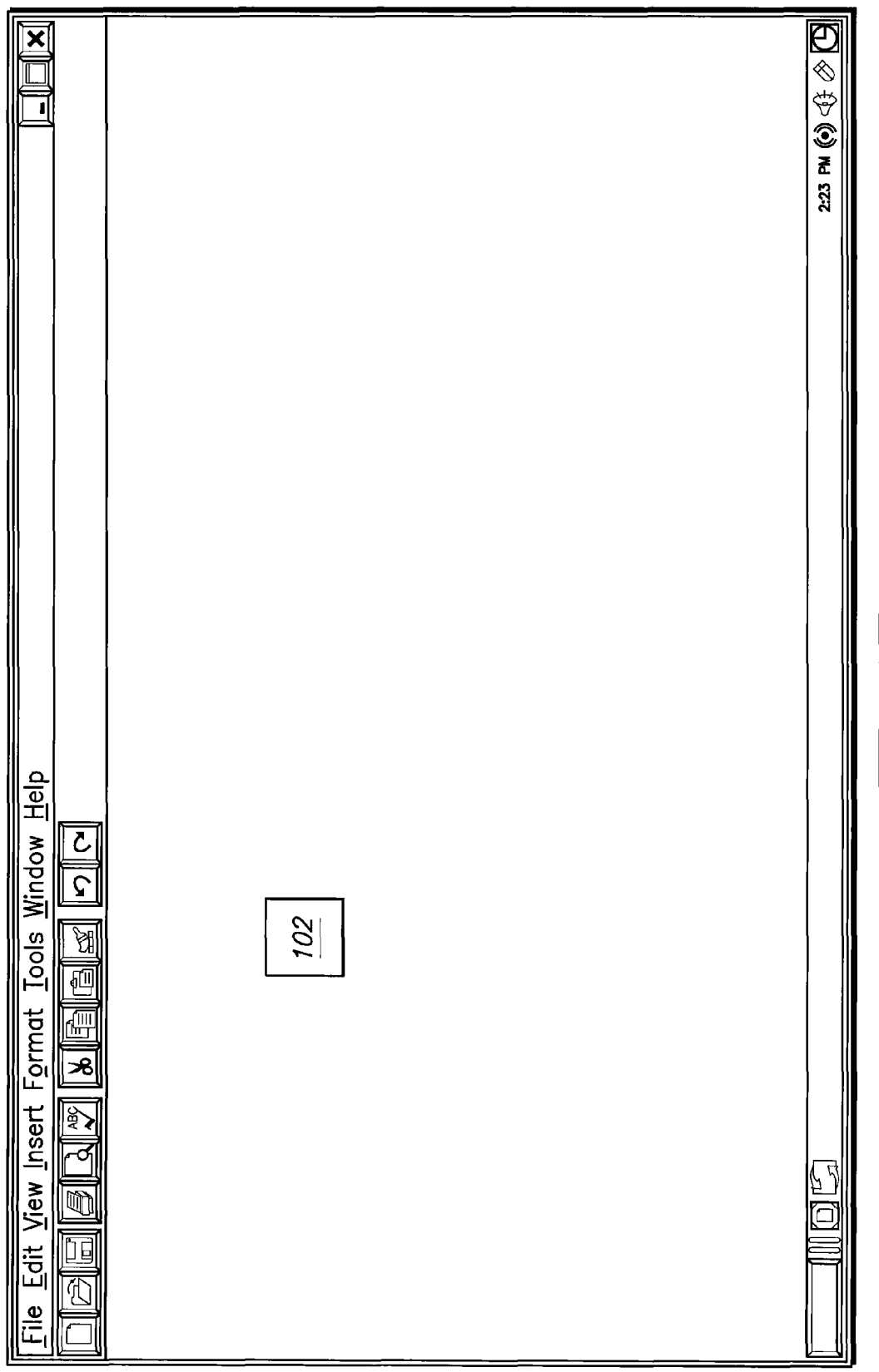
FIG. 5A illustrates a first network topology as displayed by an element manager.

FIG. 5A illustrates a network topology that element manager 150 may display to a network operator at a point in time when element manager 150 is aware of element 102 but is not yet aware of other elements of network 100. Upon communicating with element 102, element manager 150 may retrieve neighbor identification information from element 102 such as the information of chart 202. Based on the information neighbor identification retrieved, element manager 150 may determine that elements 104 and 106 should be merged into the network topology.

FIG. 5B illustrates a topology of network 100 at a point in time after element manager 150 retrieves neighbor information from element 102. The network topology of FIG. 5B includes elements 102, 104, and 106, which are directly connected to element 102. Element 134 is also directly connected to element 102. However, since element 134 is not managed directly by element manager 150, as was discussed above in relation to FIG. 1 because element 134 is part of a different network, element manager 150 might not include element 134 in the network topology. Accordingly, element 134 is not illustrated in the network topology of FIG. 5B.

Element manager 150 may then retrieve neighbor identification information from element 106 such as the information of chart 302. Based on the neighbor information retrieved from element 106, element manager 150 may become aware of the neighboring elements 108, 112, 114, and 116, which are directly connected to element 106 and may merge these elements into its topological model of network 100. Similarly, element manager 150 may retrieve neighbor identification information from element 104 and add neighboring element 128, which is directly connected to element 104 via tunnel 132, to the topological model of network 100.

Figure 5C:
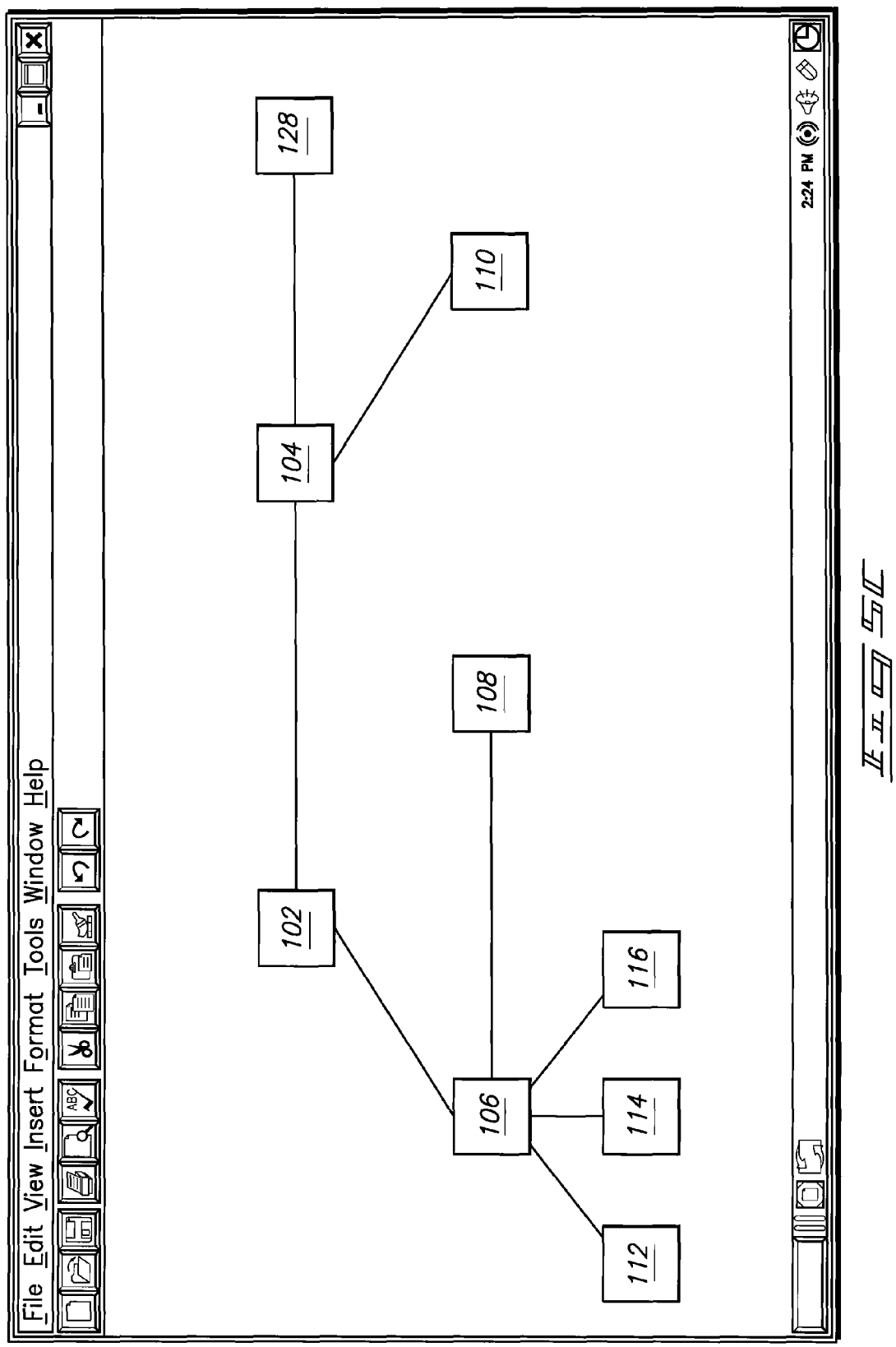
FIG. 5C illustrates a third network topology as displayed by an element manager.

FIG. 5C illustrates a topology of network 100 at a point in time after element manager retrieves neighbor identification information from elements 104 and 106, and accordingly includes additional network elements 108, 110, 112, 114, 116, and 128. Note that element 128 is shown as being directly connected to element 104 because element 128 is connected to element 104 via tunnel 132. In this case, layer-two control packets may be tunneled via tunnel 132 so that layer-two control packets, such as LLDP packets sent by element 104, are received and processed by element 128 rather than by intermediate element 130.

FIG. 5D illustrates a topology of network 100 at a point in time after element manager 150 retrieves neighbor identification information from elements 108, 110, 112, 114, 116, and 128, and accordingly includes additional network elements 118, 120, 122, 124, and 126. Note that the topology of FIG. 5C includes elements 108 and 110, but no link between elements 108 and 110 since at that moment in time element manager 150 is unaware that elements 108 and 110 are connected. A link between element 108 and 110 is present in FIG. 5D since element manager 150 has retrieved neighbor identification information describing the connection between elements 108 and 110 from elements 108 and 110 prior to displaying the topology of FIG. 5D. Element manager 150 has now discovered all of the elements of network 100 and the element topology is complete.

The progressive approach to displaying the topology of network 100 illustrated by FIGS. 5A-5D may be useful to a network operator with a large network that may take a long time to discover or to a network operator with a small or medium-sized network having few or lower-capacity element managers. Since the progressive approach regularly updates the network topology, the network operator may begin identifying misconfiguration problems present in the network before the entire network is discovered. In contrast, a known element manager might not display a network topology until the known element manager has discovered the entire network because the known element manager might not utilize neighbor identification information provided by layer-two control packets. Consequently, it may take more time to identify misconfiguration problems in a network when using a known element manager.

Typically, element managers use a different mechanism to determine how elements are connected to each other that does not enable the element manager to display a topology as it is discovered. Instead, a user must wait until the element manager has communicated with all of the elements of the network and performed a large amount of processing to determine the topology in order to view the topology. This may be disadvantageous to a network operator since the network operator may have to wait a long time for the element manager to discover all of the elements of the network and their interconnections. Furthermore, this approach may be disadvantageous since it may use an element manager having a greater amount of memory and processing power than an element manager utilizing the progressive approach.

According to another aspect of the invention, an element manager operating method includes requesting, from a selected packet switch, information describing one or more neighboring packet switches directly connected to the selected packet switch. The selected packet switch and the neighboring packet switches are associated with a network.

In response to the request, the element manager receives the information from the selected packet switch and based only on the information describing the neighboring packet switches, the element manager links at least one of the neighboring packet switches to the selected packet switch in a topological model configured to represent connections between packet switches associated with the network. After linking, the element manager may display the topological model to a user in a graphical format and may display the topological model prior to requesting neighbor information from any other packet switch.

Prior to linking, the element manager may determine that the at least one neighboring packet switch has an address within an approved address range known to the element manager. Alternatively or additionally, prior to the linking the element manager may determine that the at least one neighboring packet switch has a device class matching one of a set of approved device classes known to the element manager.

The method may also include selecting the selected packet switch from a set of packet switches awaiting neighbor discovery and adding the at least one neighboring packet switch to the set of packet switches awaiting neighbor discovery. The element manager may also add a particular packet switch to the set of packet switches awaiting neighbor discovery in response to receiving an SNMP trap from the particular packet switch.

The method may be repeated once for each of the one or more neighboring packet switches. For each repetition, a different one of the neighboring packet switches may be the selected packet switch. The element manager may perform the repetitions in parallel and each repetition may be associated with a different process, thread, or task within the element manager.

The method may be additionally repeated for each of a set of additional neighboring packet switches directly connected to the neighboring packet switches. For each repetition, a different one of the additional neighboring packet switches may be the selected packet switch.

The selected packet switch may be directly connected to one of the neighboring packet switches via a tunnel. The tunnel may traverse one or more intermediate packet switches such that the one neighboring packet switch is not physically connected to the selected packet switch. The tunnel might relay packets only between the selected packet switch and the one neighboring packet switch.

The information may include a set of one or more packet switch identifiers and a set of one or more port identifiers. Each packet switch identifier may uniquely identify one of the one or more neighboring packet switches and each port identifier may correspond to one of the one or more packet switch identifiers and may identify a port of the selected packet switch to which the neighboring packet switch identified by the corresponding packet switch identifier is directly connected.

The information may include information compiled by the selected packet switch. The compiled information may result from layer-two communication between the selected packet switch and individual ones of the neighboring packet switches. The layer-two communication may include at least one of LLDP communication, OAM communication, or LACP communication.

Programming configured to cause processing circuitry to perform the method may be included on an article of manufacture, such as a compact disc (CD), digital versatile disc (DVD), a hard disk drive, a memory chip, or other memory device.

FIG. 6 illustrates a method by which element manager 150 may track elements of network 100 for which neighbor identification information should be retrieved. According to method 600, at 602 if element manager 150 receives an SNMP trap from one of the elements of network 100, element manager 150 may add the element from which the trap was received to a list of elements awaiting neighbor discovery.

At 604, element manger 150 may probe a range of IP addresses in order to determine if elements having IP addresses within the range are present in network 100. Element manager 150 may send messages addressed respectively to each of the addresses in the range. Element manager 150 may add to the list of elements awaiting neighbor discovery, any elements having IP addresses within the range that respond to the messages to the list of elements awaiting neighbor discovery. The probe messages may be internet control message protocol (ICMP) messages or may alternatively be an SNMP get messages.

At 606, element manager 150 may add an element to the list of elements awaiting neighbor discovery in response to receiving a request from a network operator to add the element to the list. At 608, neighboring elements of a selected element may be added to the list in response to retrieving neighbor identification information identifying the neighboring elements from the selected element as is described below in relation to FIG. 7.

Of course, other events may prompt element manager 150 to add an element to the list of elements awaiting discovery. For example, if element manager 150 detects that a particular element has received new neighbor identification information via layer-two control packets from neighboring elements directly connected to the particular element, element manager 150 may add the particular element to the list of elements awaiting discovery.

Figure 7:
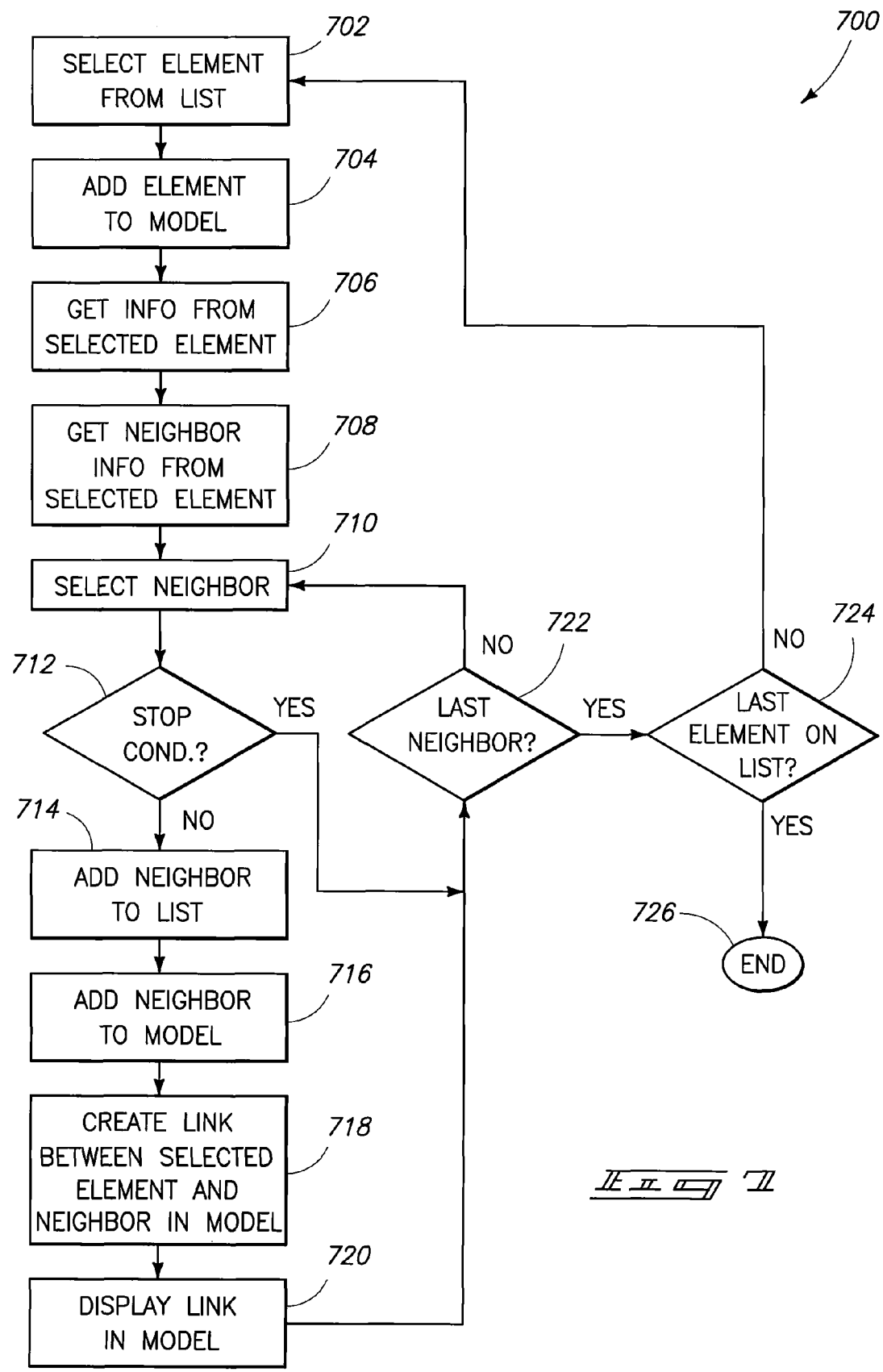
FIG. 7 illustrates a flow chart diagram of another method in accordance with an aspect of the invention.

FIG. 7 illustrates a method 700 for creating a topological model of a network such as network 100. At 702, element manager 150 may select an element from a list of elements awaiting neighbor discovery. Elements may be added to the list of elements awaiting neighbor discovery using method 600 described above.

At 704, element manager 150 may add the selected element to the topological model. Adding the selected element to the model may involve creating a new data structure for the selected element (such as an object, variable, record, or other data structure) if the selected element has not already been added to the model.

At 706, element manager 150 may retrieve information from the selected element. For example, element manager 150 may gather basic information such as a device type of the selected element, a serial number, or a manufacturer from the selected element. At 708, element manager 150 may retrieve neighbor identification information describing neighboring elements directly connected to the selected element from the selected element. The neighbor identification information may be the neighbor identification information described above in relation to FIGS. 2-4.

At 710, one of the neighboring elements directly connected to the selected element is selected. At 712, element manager 150 determines if the selected neighbor meets a stop condition. The stop condition may identify elements that should not be added to the topological model. For example, the stop condition may be related to a particular range of approved IP addresses, a set of approved device types, or a set of approved device manufacturers. The stop condition may be useful in identifying elements that might not be managed by element manager 150. If the stop condition is met, at 722 element manager 150 may determine whether the selected neighbor is the last neighbor of the selected element. If the selected neighbor is not the last neighbor, element manager 150 may select another neighbor at 710.

If the selected neighbor is the last neighbor, element manager 150 determines at 724 whether the selected element is the last element on the list of elements awaiting neighbor discovery. If the selected element is the last element on the list, the method ends at 726. Otherwise, element manager 150 may select a new element from the list at 702.

Returning now to 712, if the stop condition is not met, at 714, element manager 150 may add the selected neighbor to the list of elements awaiting neighbor discovery, as was described above in relation to 608 of FIG. 6. At 716, the selected neighbor may be added to the topological model by creating a new data structure for the selected neighbor (such as an object, variable, record, or other data structure) if the selected neighbor has not already been added to the model.

At 718, element manager 150 creates a link between the selected element and the selected neighbor element in the model. The link may include a port identifier of a port of the selected element to which the selected neighbor is connected and a port identifier of a port of the selected neighbor to which the selected element is connected.

At 720, element manager 150 may display the topological model to a user as was illustrated above in FIGS. 5A through 5D. The displayed topological model may include the link created at 718 and the neighbor added to the model at 716. At 722, element manager 150 determines whether the selected neighbor is the last neighbor of the selected element. If it is not the last neighbor, element manager 150 may select another neighbor of the selected element at 710 and may repeat steps 712 through 720 for the new selected neighbor.

In one configuration, element manager 150 may launch a different process, thread, or task for each iteration of method 700. For example, upon selecting an element from the list of elements awaiting neighbor discovery, element manager 150 may launch a new process, thread, or task in which steps 704 through 724 of method 700 may be performed. Consequently, element manager 150 may be simultaneously executing a plurality of processes, threads, or tasks, each of which is executing method 700.

In some configurations, element manager 150 may be configured to launch as many as a predetermined number of processes, threads, or tasks, but no more than the predetermined number of processes, threads, or tasks. The predetermined number may be user configurable and may be selected according to the capabilities of the server on which element manager 150 is operating. For example, it may be advantageous to limit the number of processes, threads, or tasks that may run in parallel so that there will still be processing power left to handle other element management tasks such as receiving traps. Of course, the number of processes, threads, or tasks that may run simultaneously on a high capability server may be larger than the number of processes, threads, or tasks that may run simultaneously on a low capability server.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette), zip disk, hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An element manager operating method comprising:
the element manager collecting a first element topology from a first element among a plurality of elements in a network, the first element topology describing connections between the first element and other elements of the plurality directly connected to the first element;
the element manager determining an address of a second element of the plurality of elements from the first element topology, the second element being one of the other elements of the plurality directly connected to the first element;
using the address determined by the element manager, the element manager collecting a second element topology from the second element among the plurality of elements, the second element topology describing connections between the second element and other elements of the plurality directly connected to the second element;
the element manager merging the element topologies collected from the elements into a single network topology describing connections between the plurality of elements;
wherein the first element topology comprising compiled information compiled by the first element, the compiled information resulting from layer-two (data link layer) communication using at least two different layer-two control protocols between the first element and the elements of the plurality directly connected to the first element;
wherein the compiled information comprises first information describing a first one of the other elements directly connected to the first element, the first information resulting from layer-two communication using a first layer-two control protocol between the first element and the first one of the other elements directly connected to the first element; and the compiled information comprises second information describing a second one of the other elements directly connected to the first element, the second information resulting from layer-two communication using a second layer-two control protocol between the first element and the second one of the other elements directly connected to the first element.

2. The method of claim 1 wherein the element topologies comprise information gathered by the elements using at least one of Link Layer Discovery Protocol (LLDP) packets conforming to the Institute of Electrical and Electronics Engineers (IEEE) 802.1AB standard; Operations, Administration, and Maintenance (OAM) packets conforming to the IEEE 802.3ah standard; or Link Aggregation Control Protocol (LACP) packets conforming to the IEEE 802.3ad standard.

3. The method of claim 1 wherein the element topologies comprise information gathered by the elements using OAM packets conforming to the IEEE 802.3ah standard and LLDP packets conforming to the IEEE 802.1AB standard.

4. The method of claim 1 further comprising:
after the merging, displaying the network topology to a user;
collecting a third element topology from a third element among the plurality of elements, the third element topology describing only connections between the third element and other elements of the plurality directly connected to the third element;
merging the third element topology into the single network topology; and
after the merging the third element topology, displaying the network topology to the user.

5. The method of claim 1 wherein the first element and the elements of the plurality directly connected to the first element are directly connected to each other via electrically conductive cables, fiber-optic cables, or wireless links.

6. The method of claim 1 wherein the collecting comprises collecting via Simple Network Management Protocol (SNMP) messages, eXtensible Markup Language (XML) messages, responses to command line interface (CLI) commands, replies to remote method invocations (RMIs), or NETCONF messages.

7. The method of claim 1 wherein the first element topology is derived from communication via a first protocol between the first element and at least one of the other elements of the plurality directly connected to the first element and the second element topology is derived from communication via a second protocol between the second element and at least one of the other elements of the plurality directly connected to the second element, the second protocol being different from the first protocol.

8. The method of claim 1 wherein the address is an Internet Protocol (IP) address of the second element and further comprising the element manager deriving the IP address from a medium access control (MAC) address of the second element comprised by the first element topology collected by the element manager; wherein the element manager is unaware of the IP address prior to the deriving.

9. The method of claim 1 further comprising the element manager receiving a trap comprising an address of the first element and wherein the collecting of the first element topology comprises collecting using the address of the first element.

10. The method of claim 1 further comprising receiving first connection information describing a connection between a third element of the plurality of elements and a fourth element of the plurality of elements from the third element, the third element being one of the other elements of the plurality directly connected to the first element, the fourth element being directly connected to the third element;
first determining that the first connection information satisfies a condition;
based on the first determining, adding the fourth element to a list of elements awaiting neighbor discovery;
receiving second connection information describing a connection between the third element and a fifth element of the plurality of elements from the third element, the fifth element being directly connected to the third element; and
second determining that the second connection information does not satisfy the condition;
based on the second determining, excluding the fifth element from the list of elements awaiting neighbor discovery.

11. The method of claim 10 wherein the first determining comprises determining that an address of the fourth element belongs to a predetermined set of addresses and the second determining comprises determining that an address of the fifth element does not belong to the predetermined set.

12. A network comprising:
a plurality of network elements, individual network elements being directly connected to at least one other of the network elements;
a plurality of links, individual links directly connecting two of the network elements together and enabling the two directly connected network elements to communicate with each other;
the individual network elements being configured to provide connectivity information describing their neighboring elements, of the plurality of network elements, to which the individual network elements are directly connected and describing the individual links that directly connect the individual network elements to their neighboring elements the individual network elements being configured to gather the connectivity information from their neighboring elements using at least two different layer-two control protocols; and
an element manager configured to:
gather the connectivity information from the network elements;
determine an address of a second element of the plurality of network elements from a portion of the connectivity information gathered from a first element of the plurality, the second element being directly connected to the first element, the first element providing a first element topology; and
use the address determined by the element manager to gather a portion of the connectivity information from the second element comprising a second element topology; and
create a network topology based on the gathered connectivity information comprising the first element topology and the second element topology, the network topology describing the network elements, the links, and an arrangement of the links with respect to the network elements;
wherein the first element topology comprising compiled information compiled by the first element, the compiled information resulting from layer-two (data link layer) communication using at least two different layer-two control protocols between the first element and the elements of the plurality directly connected to the first element;

wherein the compiled information comprises first information describing a first one of the other elements directly connected to the first element, the first information resulting from layer-two communication using a first layer-two control protocol between the first element and the first one of the other elements directly connected to the first element; and the compiled information comprises second information describing a second one of the other elements directly connected to the first element, the second information resulting from layer-two communication using a second layer-two control protocol between the first element and the second one of the other elements directly connected to the first element.

13. The network of claim 12 wherein the network elements are Ethernet packet switches configured to receive layer-two control packets comprising portions of the connectivity information from the neighboring elements, the layer-two control packets comprising at least one of LLDP packets, OAM packets compliant with the IEEE 802.3ah standard, or LACP packets.

14. The network of claim 12 wherein the element manager is further configured to display the network topology to a user after gathering the connectivity information from a first subset of the network elements and prior to gathering the connectivity information from a second subset of the network elements.

15. The network of claim 12 wherein the address is a medium access control (MAC) address and the element manager is further configured to derive an Internet Protocol (IP) address of the second element from the MAC address.

16. An element manager operating method comprising:
the element manager collecting a first element topology from a first element among a plurality of elements in a network, the first element topology describing connections between the first element and other elements of the plurality directly connected to the first element;
the element manager determining an address of a second element of the plurality of elements from the first element topology, the second element being one of the other elements of the plurality directly connected to the first element;
using the address determined by the element manager, the element manager collecting a second element topology from the second element among the plurality of elements, the second element topology describing connections between the second element and other elements of the plurality directly connected to the second element;
the element manager merging the element topologies collected from the elements into a single network topology describing connections between the plurality of elements;
wherein the first element topology comprising compiled information compiled by the first element, the compiled information resulting from layer-two (data link layer) communication using at least two different layer-two control protocols between the first element and the elements of the plurality directly connected to the first element;
receiving first connection information describing a connection between a third element of the plurality of elements and a fourth element of the plurality of elements from the third element, the third element being one of the other elements of the plurality directly connected to the first element, the fourth element being directly connected to the third element;
first determining that the first connection information satisfies a condition;
based on the first determining, adding the fourth element to a list of elements awaiting neighbor discovery;
receiving second connection information describing a connection between the third element and a fifth element of the plurality of elements from the third element, the fifth element being directly connected to the third element; and
second determining that the second connection information does not satisfy the condition;
based on the second determining, excluding the fifth element from the list of elements awaiting neighbor discovery.

17. The method of claim 16 wherein the element topologies comprise information gathered by the elements using at least one of Link Layer Discovery Protocol (LLDP) packets conforming to the Institute of Electrical and Electronics Engineers (IEEE) 802.1AB standard; Operations, Administration, and Maintenance (OAM) packets conforming to the IEEE 802.3ah standard; or Link Aggregation Control Protocol (LACP) packets conforming to the IEEE 802.3ad standard.

18. The method of claim 16 wherein the element topologies comprise information gathered by the elements using OAM packets conforming to the IEEE 802.3ah standard and LLDP packets conforming to the IEEE 802.1AB standard.

19. The method of claim 16 further comprising:
after the merging, displaying the network topology to a user;
collecting a third element topology from a third element among the plurality of elements, the third element topology describing only connections between the third element and other elements of the plurality directly connected to the third element;
merging the third element topology into the single network topology; and
after the merging the third element topology, displaying the network topology to the user.

20. The method of claim 16 wherein the first element and the elements of the plurality directly connected to the first element are directly connected to each other via electrically conductive cables, fiber-optic cables, or wireless links.

21. The method of claim 16 wherein the collecting comprises collecting via Simple Network Management Protocol (SNMP) messages, eXtensible Markup Language (XML) messages, responses to command line interface (CLI) commands, replies to remote method invocations (RMIs), or NETCONF messages.

22. The method of claim 16 wherein the first element topology is derived from communication via a first protocol between the first element and at least one of the other elements of the plurality directly connected to the first element and the second element topology is derived from communication via a second protocol between the second element and at least one of the other elements of the plurality directly connected to the second element, the second protocol being different from the first protocol.

23. The method of claim 16 wherein the address is an Internet Protocol (IP) address of the second element and further comprising the element manager deriving the IP address from a medium access control (MAC) address of the second element comprised by the first element topology collected by the element manager;

wherein the element manager is unaware of the IP address prior to the deriving.

24. The method of claim 16 further comprising the element manager receiving a trap comprising an address of the first element and wherein the collecting of the first element topology comprises collecting using the address of the first element.

25. The method of claim 16 wherein the first determining comprises determining that an address of the fourth element belongs to a predetermined set of addresses and the second determining comprises determining that an address of the fifth element does not belong to the predetermined set.

26. The method of claim 16 wherein the compiled information comprises first information describing a first one of the other elements directly connected to the first element, the first information resulting from layer-two communication using a first layer-two control protocol between the first element and the first one of the other elements directly connected to the first element; and the compiled information comprises second information describing a second one of the other elements directly connected to the first element, the second information resulting from layer-two communication using a second layer-two control protocol between the first element and the second one of the other elements directly connected to the first element.

* * * * *